July 7, 1931.   T. H. THOMAS   1,813,211
AUTOMATIC COUPLING
Filed Jan. 28, 1928   2 Sheets-Sheet 1

INVENTOR
THOMAS H. THOMAS
BY Wm. M. Cady
ATTORNEY

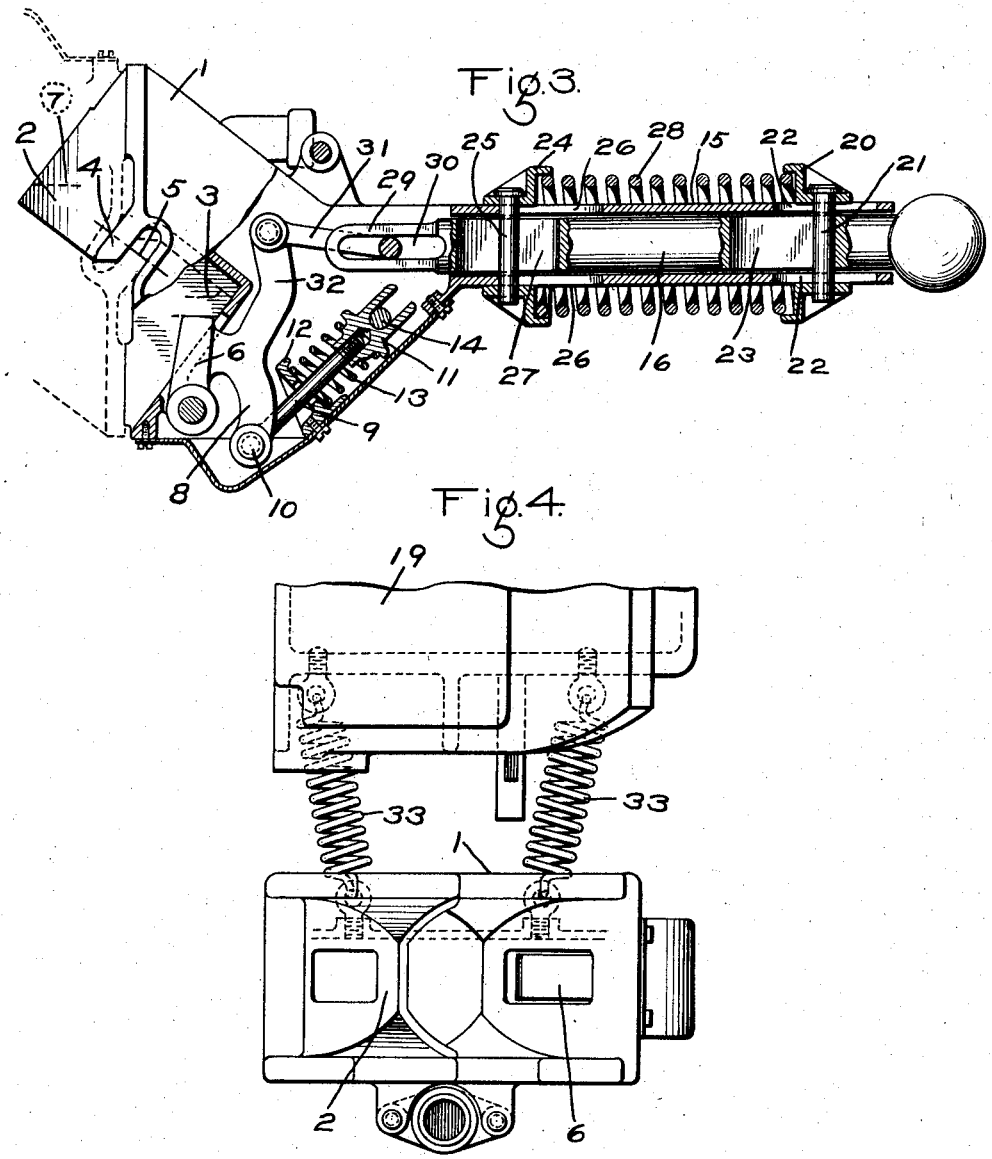

Patented July 7, 1931

1,813,211

UNITED STATES PATENT OFFICE

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

AUTOMATIC COUPLING

Application filed January 28, 1928. Serial No. 250,226.

This invention relates to automatic train pipe couplings, and more particularly to the type known as the tight or rigid lock coupling, such as shown, for example in the Westinghouse Patent No. 708,747, dated September 9, 1902, and in which each coupling head is provided with a laterally projecting hook-shaped portion adapted to engage the corresponding portion of a counterpart coupling by a relative lateral movement, and be rigidly locked together by cam levers, one pivoted upon each coupling head and bearing against the other counterpart coupling head. Train pipe passages are formed in the coupling heads and are provided with gaskets adapted to abut against corresponding gaskets of the counterpart coupling head when the two are connected together.

While a coupling of the above type will automatically couple with a counterpart coupling when two cars are brought together, it is necessary to manually operate the cam levers, when it is desired to uncouple, in order to release the locking of the coupling heads and thus permit the coupling heads to separate, when the cars are pulled apart.

The principal object of my invention is to provide a train pipe coupling of the above tight lock type, and means by which the couplings will automatically uncouple when cars are separated as well as automatically couple when cars are brought together.

Figure 1:
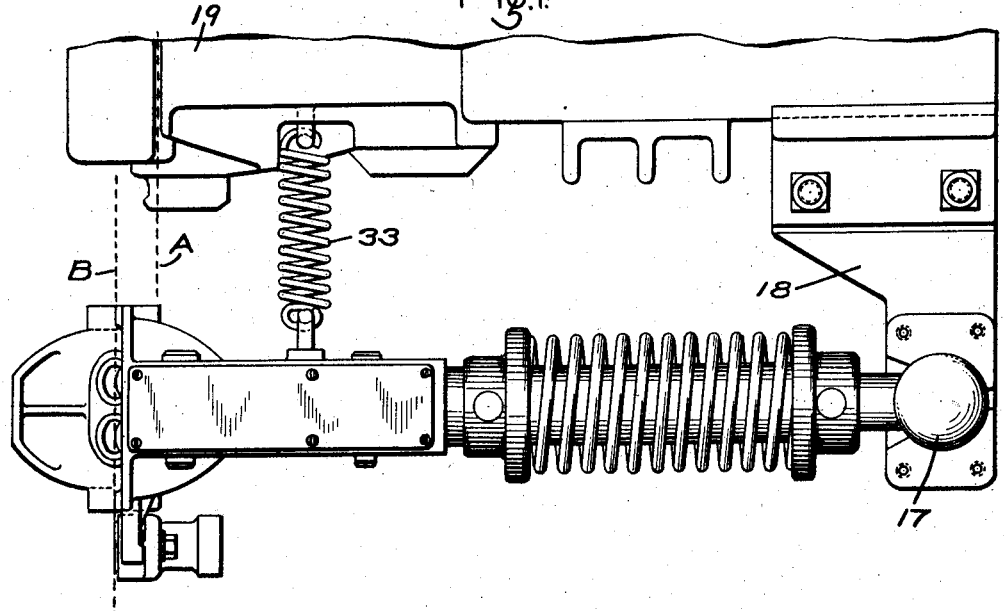
Figure 2:
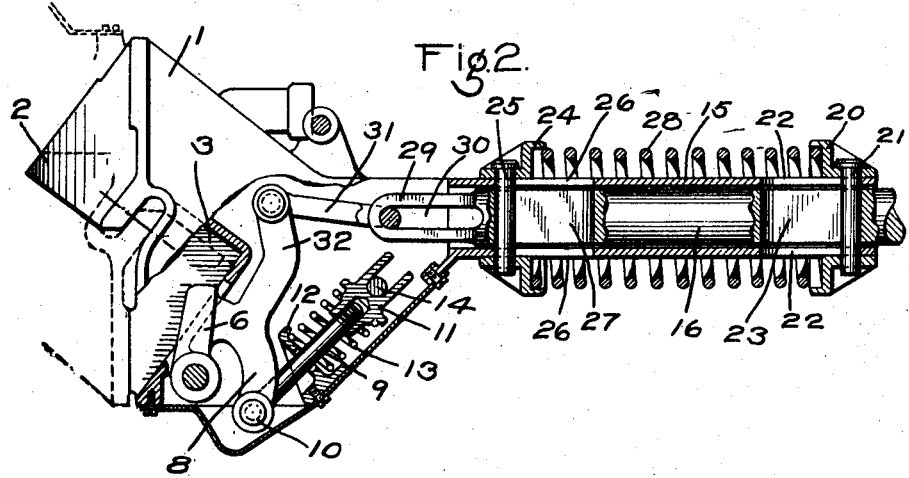

In the accompanying drawings: Fig. 1 is a side elevation of an automatic train pipe coupling embodying my invention and shown associated with the usual car coupler installation; Fig. 2 a plan view, partly in section, of the automatic train pipe coupling; Fig. 3 a view similar to Fig. 2, but showing the parts as positioned when in the coupled position; and Fig. 4 an end elevation of the construction shown in Fig. 1.

The automatic train pipe coupling head 1 comprises a projecting nose 2 adapted to engage in a recess 3 of a counterpart coupling head and hooked portions 4 arranged above and below a plane surface 5, the plane surface 5 being provided with one or more openings for train pipe communications and each hooked portion of one coupling head being adapted to engage and interlock with a corresponding hook portion of a counterpart coupling head.

The coupling head is provided with a pivoted cam or latch lever 6 having a cam surface for engaging a curved face 7 of a counterpart coupling head.

The lever 6 carries an arm 8 to which a rod 9 is pivotally connected by a pin 10. At the outer end of the rod is secured a member 11 and interposed between said member and a fixed abutment 12 is a coil spring 13. A guide pin 14, secured to the coupling head is adapted to engage in a slot provided in the member 11.

Carried by the shank of the coupling head and extending rearwardly is a tubular section 15 which is slidably mounted on a stem 16. The rear end of the stem is provided with a ball section 17 which is mounted in a corresponding socket portion carried by a depending bracket 18, the bracket being secured to the car.

The train pipe coupling is disposed below the usual car coupler 19 and is yieldingly maintained in position by springs 33 which support the train pipe coupling from the car coupler 19.

A follower collar 20 is slidably mounted on the rear portion of the sleeve 15 and carries a pin 21 which extends through elongated slots 22 in the sleeve 15 and also through an elongated slot 23 in the stem 16. A front follower collar 24 is also mounted on the sleeve 15 and carries a pin 25 which extends through elongated slots 26 in the sleeve 15 and through an elongated slot 27 in the stem 16. A coil spring 28 is interposed between the collars 20 and 24 and the spring is adapted to be compressed upon movement of either collar relative to the other. Said spring is also under initial compression which tends to hold the parts in the position shown in Fig. 2, with the pins 21 and 25 engaging the extreme ends of the corresponding guide slots.

At the front end, the stem 16 is provided with an extended portion 29 having an elongated slot 30 and engaging in said slot is a U shaped link 31 which is pivotally connected to a lever arm 32 carried by the cam lever 6.

The train pipe coupling 1 is so positioned longitudinally with respect to the car coupler 19 that the center coupling link B of the train pipe coupling is normally in advance of the center coupling line A of the car coupler 19, as shown in Fig. 1, for example, the distance between the lines A and B when the couplings are not coupled may be one and one-half inches.

In operation, when cars are brought together for coupling up, the projecting nose 2 of one train pipe coupling enters the recess 3 of the counterpart coupling and in this movement, the cam lever 6 is forced rearwardly by the nose 2. The hooked portions 4 of the two couplings become interlocked through the relative lateral and longitudinal movement and the plane faces 5 meet, so that the train pipe openings therein are connected together. The cam lever 6 of one coupling is then moved forward by the pressure of spring 13, so that the cam face of each cam lever engages the curved face 7 of the counterpart coupling heads, so as to lock the two coupling heads tightly together.

As the train pipe coupling on each car moves rearwardly relatively to the car coupler 19 on the car, the two car couplers engage and interlock in the usual manner, the car couplers being in the fully coupled position when the train pipe coupling has moved so that the center line B of the train pipe coupling coincides with the center line A of the car coupler.

During this movement, the sleeve portion 15 is moved rearwardly and carries with it the pin 25 and the follower collar 24. The rear follower 20 is held against rearward movement by engagement of the pin 21 with the stem 16, so that the spring 28 is compressed and the link 31 assumes an intermediate position in the slot 30, as shown in Fig. 3, rearward movement of the sleeve 15 being permitted by the slots 22.

The slot 30 is of sufficient length to permit of a further rearward movement of the coupling head, for example, an inch and one-half, so as to allow for variations and wear of the parts.

When cars are separated, the car couplers 19 are first unlocked to permit uncoupling in the usual manner and as the cars separate, the train pipe couplings remain coupled and locked together until the cars have moved apart sufficiently to first cause the parts to assume the positions shown in Fig. 2 and then as the cars move further apart, the arm 32 is pulled in a clockwise direction by the pull of the link 31 engaging the end of the slot 30, so that the cam lever 6 is moved in a clockwise direction to effect the automatic unlocking of the train pipe couplings.

After the train pipe couplings separate, the spring 28 will return the parts to normal position ready for coupling up, as shown in Fig. 2.

When cars are coupled together, the car couplers 19 being locked together, relative movement of the train pipe couplings such as would effect the unlocking of the train pipe couplings is prevented, and it is only when the car couplers are unlocked and the cars are permitted to separate, that the train pipe couplings automatically unlock and separate.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a train pipe coupling having a tubular extended portion and a locking lever for locking the coupling in its coupled position, of a member slidably mounted in said extended portion and provided with a slot, and a link connected to said lever and engaging in said slot and movable in said slot relatively to said member.

2. The combination with a train pipe coupling having an extended portion and a locking lever for locking the coupling in its coupled position, of a member on which said extended portion is slidably mounted, means operatively connecting said lever to said member, followers, a spring interposed between said followers, and a pin carried by each follower, said pins extending through slots in said member and said extended portion.

3. The combination with a train pipe coupling having a rearwardly extending sleeve section and a locking lever for locking the coupling in its coupled position, of a stem mounted in said sleeve section and having one end anchored to the car and having a slot at the other end, a link working in said slot and operatively connected to said locking lever, follower plates mounted on said sleeve section, pins connected to said plates and extending through slots in said stem, and a spring interposed between said plates.

4. The combination with a train pipe coupling having a tubular extended portion and a locking lever for locking the coupling in its coupled position, of a member slidably mounted in said extended portion and having one end anchored to the car and the other end provided with a slot, and a link connected to said lever, and movably mounted in said slot.

In testimony whereof I have hereunto set my hand.

THOMAS H. THOMAS.